Aug. 20, 1929.  R. G. WILLIAMS  1,725,120
MEANS FOR SUPPORTING AND BONDING MESSENGER CABLES
AND CONDUITS FOR ELECTRICAL CONDUCTORS
Filed June 27, 1928
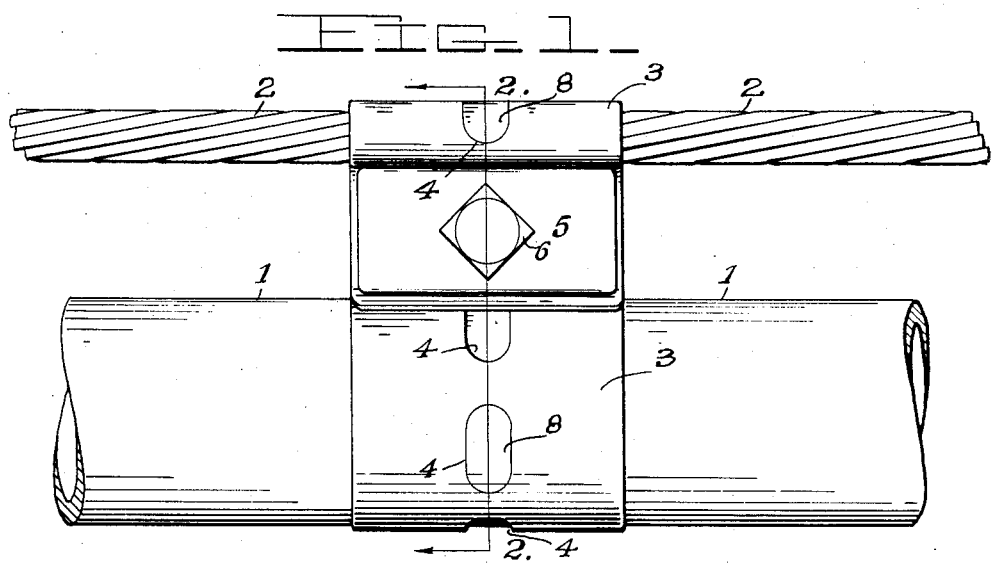
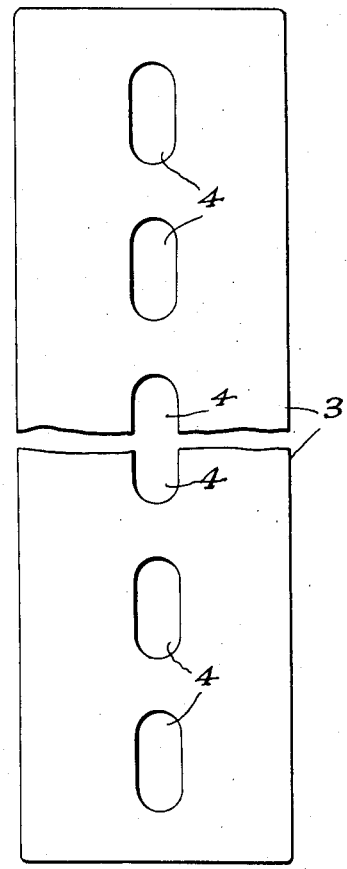
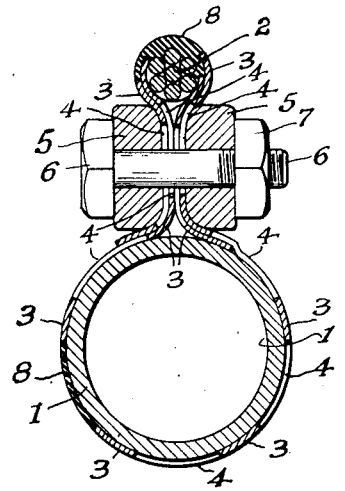
Inventor
Rolland G. Williams
by
Attorney Patented Aug. 20, 1929.

1,725,120

UNITED STATES PATENT OFFICE.

ROLLAND G. WILLIAMS, OF BRANFORD, CONNECTICUT, ASSIGNOR TO MALLEABLE IRON FITTINGS COMPANY, OF BRANFORD, CONNECTICUT, A CORPORATION OF CONNECTICUT.

MEANS FOR SUPPORTING AND BONDING MESSENGER CABLES AND CONDUITS FOR ELECTRICAL CONDUCTORS.

Application filed June 27, 1928. Serial No. 288,729.

This invention relates to means for establishing a proper bonding connection between a messenger cable and a sheathing or conduit, usually made of lead, for containing electrical conductors.

Heretofore it has been the practice to essay a bonding connection between the cable and conduit by lashing them together at spaced locations by means of wire, but the sagging of the cable and conduit between the poles causes a great weight to be imposed on the fixtures which secure the cable to the poles, and this sagging together with the swaying of the cable conduit during storms, has caused a creeping of both cable and conduit within the lashings, and this has rendered the grounding of the cable imperfect and electrolysis has occurred with the usual injurious effects.

This invention has for its object to prevent these injurious effects resulting from the setting up of electrolysis due to the imperfect bonding connections between the sheathing or conduit and the cable, and to that end the object of this invention is to establish a perfect bond connection between the sheathing or conductor and the cable.

Referring to the accompanying drawing—

Figure 1 is a side elevation showing the improvement applied in position for use.

Figure 2 is a section at the line 2—2 of Figure 1, and

Figure 3 is a broken detail view of the metal strap from which the bonding connection is formed.

Similar numerals of reference denote like parts in the several figures of the drawing.

1 is the sheathing or conduit, usually made of lead, and 2 the messenger cable.

3 is a wide strap which is made of suitable metal, such as copper which is first tinned in order to prevent any galvanic action between the lead and the strap, this strap being formed with elongated openings 4 about midway thereof throughout its length, the strap being applied around the conduit and with its ends lapped around the cable as shown in the drawing, and primarily secured by means of clamping plates 5 and a bolt 6 and nut 7.

After the strap has been applied in this manner solder is run within one or more of the openings 4 as designated by the numeral 8, so as to establish a firm bonding connection, not only between the strap and the cable and between the strap and the sheathing, but also between the sheathing and the cable, so that there can be no bad effects due to the setting up of electrolysis.

The metal strap is wide so that it will not cut into the lead sheathing and also so that it will have a wide bearing on the cable and insure stability in effect.

What is claimed is:—

1. The hereindescribed improvement in means for establishing a bonding connection between a sheathing conduit for electrical conductors and a messenger cable, comprising a comparatively wide and flexible sheet metal strap perforated at suitable intervals throughout its length, said strap embracing said sheathing, the extremities of the strap being lapped around the messenger cable, clamping members applied to said strap intermediate said cable and sheathing whereby the strap is confined in close contact relation with said cable and sheathing, and solder applied to said cable and sheathing through the perforations in the strap whereby a firm bonding connection is established between said cable and sheathing.

2. A construction as in claim 1, further distinguished in that the strap is made of copper tinned on both sides to prevent galvanic action.

In testimony whereof I affix my signature hereto.

ROLLAND G. WILLIAMS.